Aug. 20, 1968  C. W. GREEN, JR  3,397,537
ROCKET INJECTOR HEAD
Filed Sept. 14, 1966  4 Sheets-Sheet 2
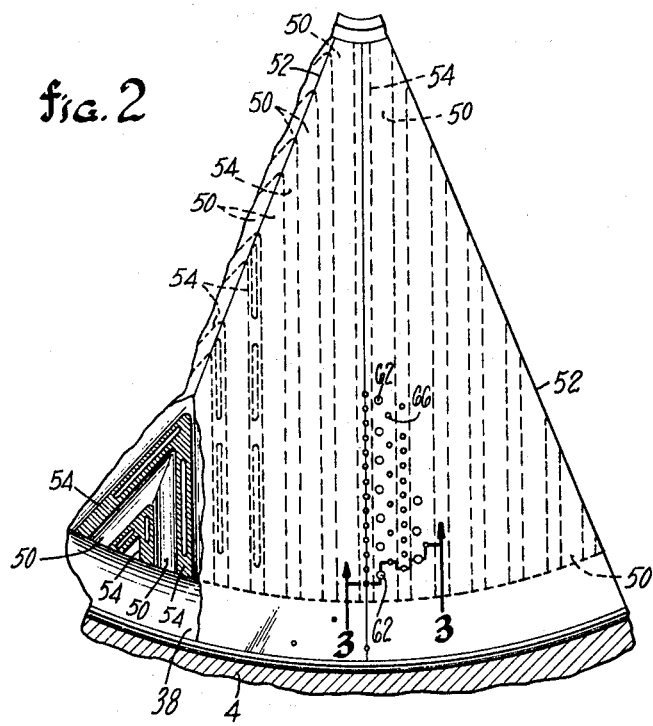
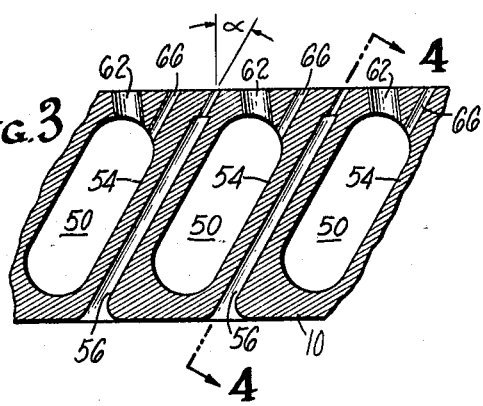
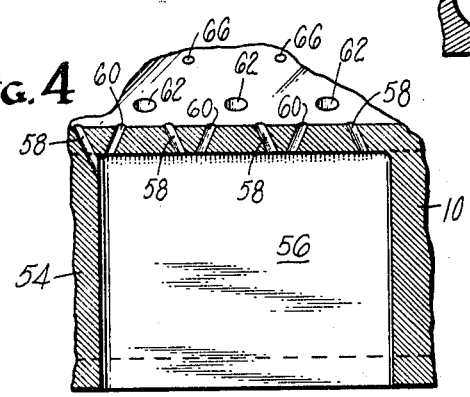

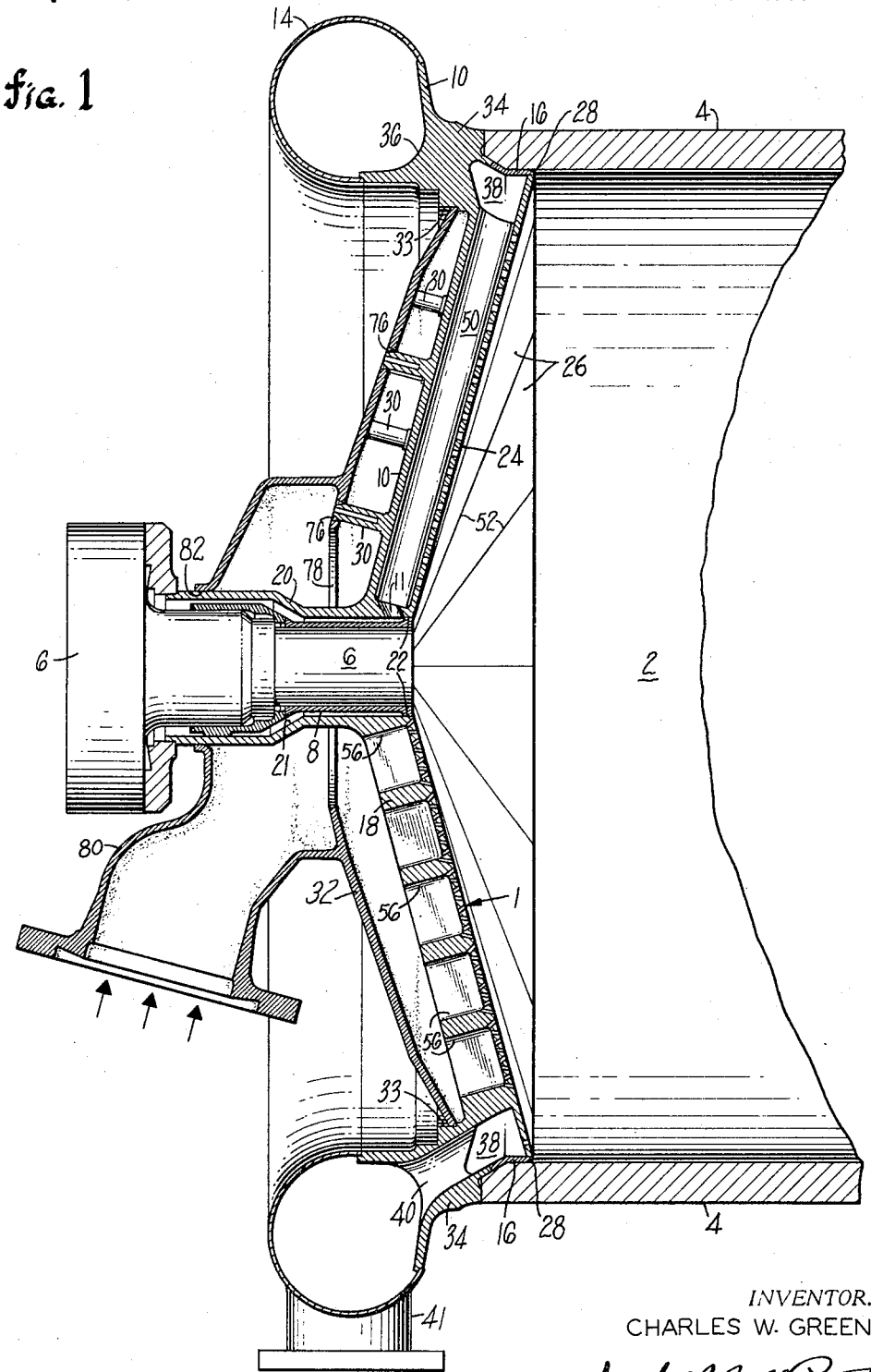

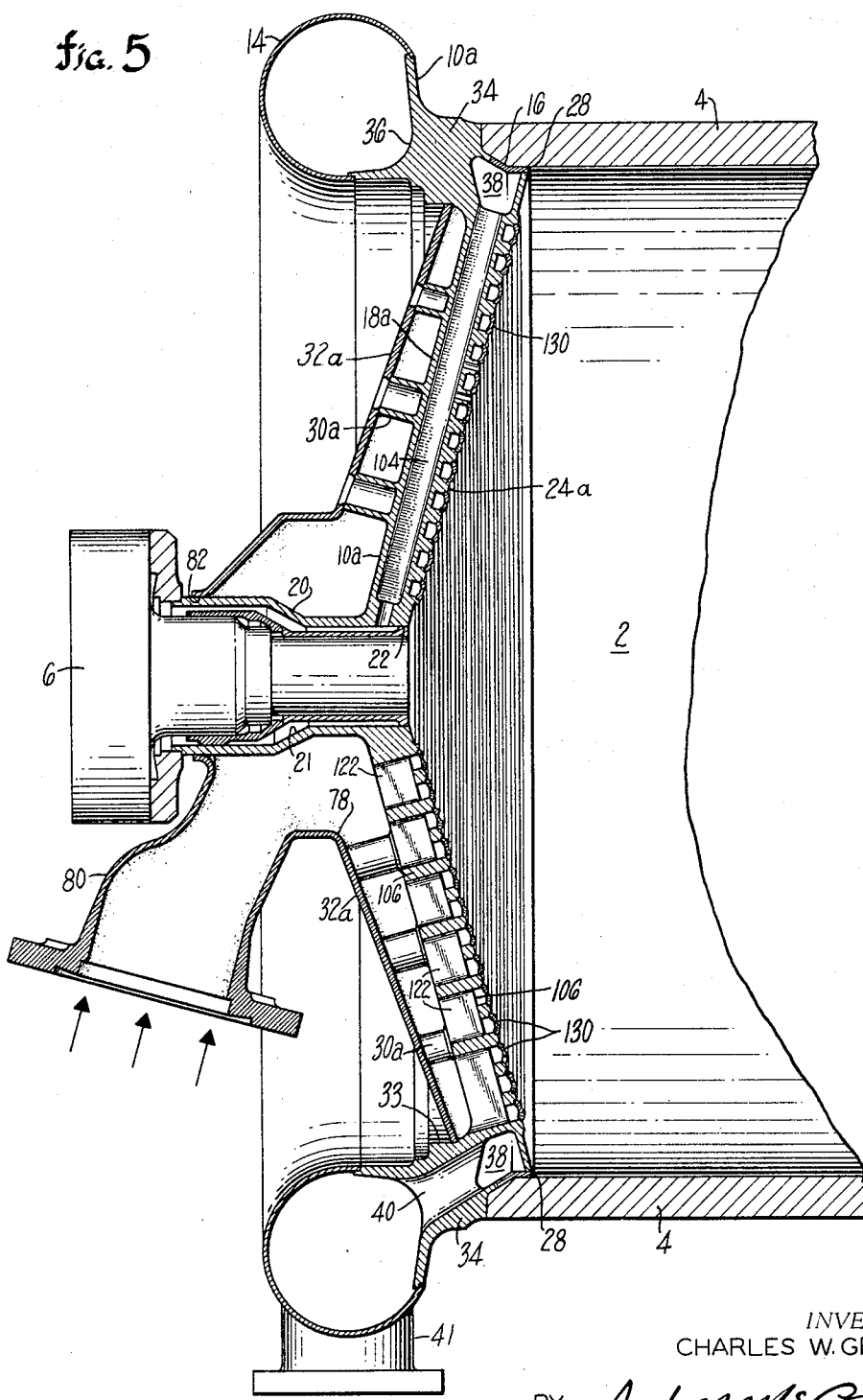

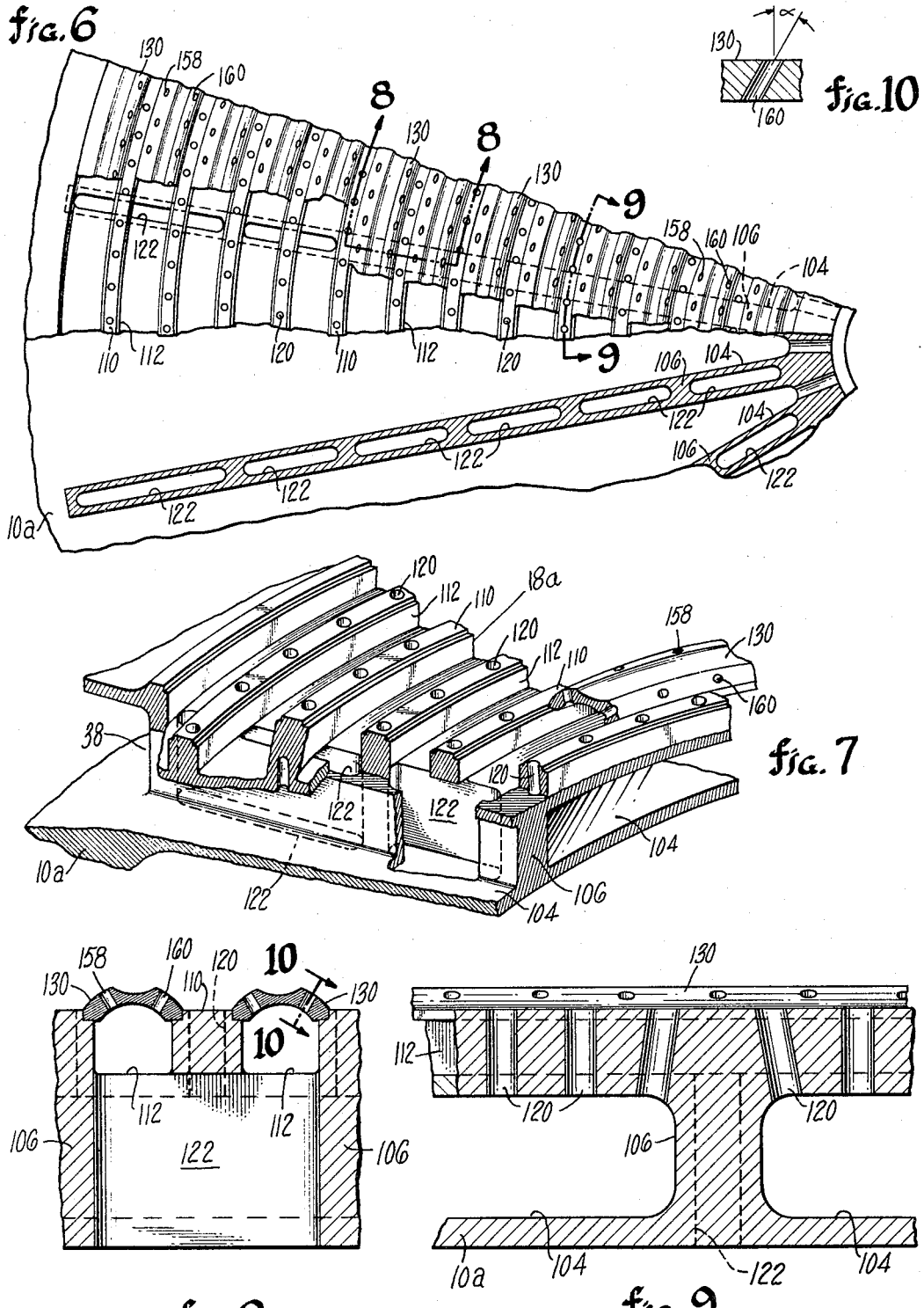

United States Patent Office 3,397,537
Patented Aug. 20, 1968

3,397,537
ROCKET INJECTOR HEAD
Charles W. Green, Jr., Jupiter, Fla., assignor to United Aircraft Corporation, East Hartford, Conn., a corporation of Delaware
Filed Sept. 14, 1966, Ser. No. 579,376
10 Claims. (Cl. 60—39.74)

This invention relates to an injector head for a rocket and is especially for use with two fluid propellants. The invention described herein was made in the performance of work under a NASA contract and is subject to the provisions of section 305 of the National Aeronautics and Space Act of 1958, Public Law 85-568 (72 Stat. 435; 42 U.S.C. 2457).

An object of this invention is to provide a high number of liquid oxygen and gaseous hydrogen orifices per unit area as a means of giving intimate mixing and, therefore, more thorough combustion.

Another object of this invention is to provide for a maximum number of direct propellant impingements providing optimum mixing and atomization.

A further object of this invention is to provide an injector head which will prevent leakage of one propellant to the other within the head.

Another object of this invention is to provide an injector head which will maintain high combustion levels within a short combustion chamber.

A further object of this invention is to bring the flame front as close to the injector face as possible.

Another object of this invention is to provide an injector head which has all the openings for one propellant located at the same angle with respect to a radial plane to permit a short combustion chamber.

Other objects and advantages will be apparent from the specification and claims and from the accompanying drawings which illustrate embodiments of the invention.

FIGURE 1 is a sectional view of the injector head showing both propellant flow paths.

FIGURE 2 is a sectional view of the face of the injector showing the orifice pattern and location of the propellant flow passages.

FIGURE 3 is an enlarged sectional view taken along the line 3—3 of FIGURE 2.

FIGURE 4 is a view taken along the line 4—4 of FIGURE 3.

FIGURE 5 is a sectional view of a modification of the injector head showing both propellant flow paths.

FIGURE 6 is a sectional view of the face of the injector showing the orifice pattern and location of the propellant flow passages.

FIGURE 7 is a perspective view showing propellant flow through the propellant flow passages and onto the face of the injector.

FIGURE 8 is an enlarged sectional view taken along the line 8—8 of FIGURE 6.

FIGURE 9 is an enlarged sectional view taken along the line 9—9 of FIGURE 6.

FIGURE 10 is a sectional view taken along the line 10—10 of FIGURE 8.

As viewed in FIGURE 1, the injector head 1 is shown in conjunction with a combustion chamber 2 having a circular side wall 4. The injector head has a centrally located opening in which an igniter 6 is centrally positioned by use of a spacing sleeve 8. Details of igniters are shown in U.S. Patent 3,056,257 and in U.S. Patent 3,057,159. Igniter fluids can be directed to the igniter by any means desired. One way of directing a fluid to the igniter is by providing a passageway from the injector head itself. This can be done as shown in the drawing by a passageway 11 at the end of passageways 50 to an annular space formed by the spacing sleeve 8. The head is constructed for the injection of two distinct propellants into the main combustion chamber 2. The annular side wall 4 may be suitably attached to the injector head by any desired arrangement.

The injector head comprises four parts, (1) the main body portion 10, (2) a cooperating plate member 32 for providing a flow chamber for one propellant, (3) a cooperating manifold portion 14 to provide a propellant manifold for the second propellant, and (4) an annular end plate 16 for enclosing an annular propellant groove formed around the outer edge of the body 10.

The main body portion 10 is formed from an integral piece and has a main annular member 18 which contains the propellant passages for transfer of the propellants from their manifolds (to be hereinafter described) to the combustion chamber 2. This annular portion 18 includes a face 24 which faces the combustion chamber 2 and is formed of sixteen (16) radial sectors 26 each formed as a flat surface and tapering inwardly from an outer circular edge 28 to an opening 22. A cylindrical member 20 extends rearwardly from the annular member 18 with its inner surface 21 extending to the opening 22. Integral spacing members 30 extend rearwardly from the back of the annular member 18 to engage the cooperating plate member 32 (to be hereinafter described).

The forward outer edge of the main annular member 18 terminates in the circular edge 28 of face 24 and the rearward outer edge of the main annular portion 18 ends in an annular built-up section 34. This section includes an annular groove 36 which faces rearwardly and upwardly (for a purpose to be hereinafter described). The interior of this section facing the cylindrical member 20 includes a step 33 for receiving the outer circular end of the plate member 32. The annular end of the main annular portion 18 has a groove 38 formed therearound. Annular end plate 16 encloses this groove 38 and is fixed by any satisfactory means. The cooperating manifold portion 14 is fixed to the outer member 34 to provide a complete propellant manifold. Any satisfactory fixing means can be used. Passageways 40 connect the interior of the manifold to the groove 38. An inlet section 41 extends from the manifold to be connected to a first propellant source.

The main annular portion 18 is formed having eight internal radial segments, which are alike (see FIG. 2), which includes two sectors 26 on the face of portion 18. In one of the eight radial segments parallel first propellant passageways 50 are located extending from the groove 38 to a plane which passes longitudinally through a side line 52 of each cooperating radial segment or to a point adjacent the center opening 22. At this plane, the ends of the passageway meet and the edges of the cooperating passageways are made smooth. As seen in FIGURE 3, the passageways 50 are loacted at an angle $\alpha$ of approximately 30° with a radial plane passing through the centerline of each segment and webs 54 are formed between each pair of passageways. From the rear of the main body portion 10, second propellant slots 56 are formed along each web 54 and are located at the same angle as the first propellant passageways 50.

As viewed in FIGURE 4, at the ends of the slots 56 are passageways 58 and 60 to permit a flow of the second propellant into the combustion chamber from the face of the injector. Passageways 62 extend between the first propellant passageways 50 and the face of the injector so as to permit the first propellant to be injected into the combustion chamber 2. It can be seen that throughout the entire face of the injector, the oxygen is injected first at an angle of approximately 30° to the longitudinal axis of the combustion chamber and then pairs of orifices 58 and 60 are placed at an angle to the face of the injector and to each other so as to intersect each other. Each opening 62, for the first propellant, is also placed at an angle so as to intersect each stream of second propellant as they impinge one upon the other. Openings 66 are provided for the first propellant to cool the face of the injector.

The cooperating plate member 32 is fixed at its outer circular end to the step 33 located on the interior of the annular built-up section 34. This circular end can be fixed by any means desired, such as by welding. The cooperating plate member 32 has openings 76 therein which mate with the free ends of the integral spacing members 30. These members 30 are tapered inwardly at their outer ends and project into the openings. The annular V space formed by the interior of the holes 76 and the slanting annular ends of the spacing members 30 are filled with a brazing material to further rigidly fix the plate member to the main body 10.

The plate member 32 has an opening 78 at the center thereof through which the cylindrical member 20 extends. A conduit 80 is integrally attached to the plate member 32 around the opening 78 and extends away therefrom at an angle thereto. An opening 82 is provided in the conduit means to receive the cylindrical member 20. These two members are fixed at this point to prevent any leakage therefrom. The free end of the conduit means is connected to a second propellant source so that it can be directed to the injector head.

With reference to FIGURE 5, the injector head comprises the same four parts making up the injector head of FIGURE 1. However, the main body portion differs in that the flow passages and face plate are constructed in a different manner. The main body portion 10a is formed from an integral piece and has a main annular member 18a which contains the propellant passages for transfer of the propellants from their manifolds to the combustion chamber 2.

This annular portion 18a includes a face 24a which faces the combustion chamber 2 and is formed in a conelike shape tapering inwardly from an outer circular edge 28 to an inner opening 22. Along the face of this tapered cone, thirteen (13) (see FIG. 6) annular grooves 112 are spaced equally, with lands 110 between, from the inner end of member 18a adjacent the opening 22 to the outer end at a short distance inwardly from the edge 28. In a manner similar to the injector head of FIGURE 1, a cylindrical member 20 extends rearwardly from the annular member 18a with its inner surface 21 extending to the opening 22. Integral spacing and holding members 30a extend rearwardly from the back of the annular member 18a to engage the cooperating plate member 32a in a manner similar to spacing members 30. The outer portion of the annular member 18a is similar to that of the injector head of FIGURE 1 described above, as is the manifold portion 14 and conduit 80. The igniter 6 can be identical to that hereinbefore referred to.

In the annular member 18a, eighteen (18) radial webs 106 extend between the solid inner portion of the member 18a around the opening 22 and the solid outer portion 34. These webs extend from their inner center end outwardly at a constant thickness. The eighteen radial passageways 104 between said webs 106 extend at their wide outer ends into the groove 38 and at their inner ends each have a passageway to conduct the fluid to the igniter if necessary. These radial passageways 104 are first propellant passageways.

From the rear of the main body portion 10a, second propellant slots 122 are formed along each web 106 and extend to the bottom of the grooves 112. Extending outwardly from the center of the injector face there are six of these slots. The first five feed adjacent pairs of grooves and the outer slots feed the outer three grooves. Each groove 112 is notched around its two facing outer edges to receive cooperating circular ends of annular insert members 130. These annular members, or rings, 130 have orifices 158 and 160 located therearound at an angle $\alpha$ of approximately 30° with a radial plane passing through the centerline of the combustion chamber. Therefore, in both injector heads the orifices injecting the second propellant do so at an angle of approximately 30° throughout the entire face. Passageways 120 are arranged to inject a flow of first propellant so that it meets the second propellant where the flows from cooperating orifices 158 and 160 meet. Extra cooling holes are located wherever necessary.

Operation

In the injector heads shown in FIGURES 1–4 and FIGURES 5–10, many combinations of propellants can be used, however, liquid oxygen and gaseous hydrogen have been envisioned for these two injector heads.

In the injector head shown in FIGURES 1–4, the first propellant, gaseous hydrogen, will be admitted through the inlet 41 into the manifold formed around the outer edge of the main body portion 10, and from there it will pass through passageway 40 to the groove 38 around the end of the injector head. From this groove the first propellant will flow down passageways 50 to the orifices 62 for combustion and 66 for cooling. This hydrogen will also pass through the openings at the end of the passageways 50 so that it can be used for ignition when necessary.

At the same time, the second propellant, liquid oxygen, will enter the conduit 80 and be admitted to the rear ends of all of the slots 56. The second propellant will then pass out of the openings 58 and 60 through the face of the injector into the combustion chamber 2. All of the openings 58 and 60 form an angle of approximately 30° with a radial plane extending therethrough and all extend in the same direction. Each pair of second propellant openings 58 and 60 are also angled to intersect and impinge one on the other a short distance from the face of the injector head. One orifice 62 connected to a passageway 50 is angled to intersect the flows from each combination of openings 58 and 60 where they meet. The igniter 6 can be used when necessary.

In the injector head shown in FIGURES 5–10 the first propellant, gaseous hydrogen, will be admitted in the same manner as in the other injector head, that is, through the inlet 41 into the manifold formed around the outer edge of the main body 10a and from there it will pass from passageway 40 to the groove 38 around the end of the injector head. From this groove, the first propellant will flow down pasageways 104 to the orifices 120 for combustion and other orifices for cooling. This hydrogen will also pass through the openings at the end of the passageways 104 so that it can be used for ignition when necessary.

At the same time, the second propellant, liquid oxygen, will enter the conduit 80 and be admitted to the rear ends of all of the slots 122. The second propellant will then pass into the grooves 112 and through the openings 158 and 160 in the annular insert members or rings 130 into the combustion chamber 2. All of the openings 158 and 160 form an angle of approximately 30° with a radial plane extending therethrough and all extend in the same direction. Each pair of second propellant openings 158 and 160 of adjacent rings are also positioned to intersect and impinge one on the other a short distance from the face of the injector head. One orifice 120 connected to a passageway 104 is positioned to intersect the flows from each combination of openings 158 and 160 where they meet. As before, an igniter can be used when necessary.

It is to be understood that the invention is not limited to the specific embodiments herein illustrated and described, but may be used in other ways without departure from its spirit as defined by the following claims.

I claim:
1. An injector head for introducing propellants into a rocket combustion chamber and mixing them therein including:
   (1) a main body portion (10), said main body portion being formed from an integral piece comprising:
      (a) a main annular member (18),

(b) said main annular member forming an injector face (24) on one side and having short spacing members (30) extending from the rear thereof, (c) an annular propellant groove (38) around said main body portion, (d) passageways (50) extending inwardly from said groove (38), (e) first orifices (62) extending between the passageways (50) and face (24), (f) webs (54) formed between each passageway (50), (g) slots (56) extending along each web between the rear of the main annular portion (18) and a point adjacent the face (24), (h) second and third orifices (58 and 60) connecting the slots to the face (24) of the annular portion (18), (2) a cooperating plate member (32) for providing a flow chamber for one propellant, said cooperating plate member (32) having:

(a) an outer circular edge fixed to the rear of said main body portion at its outer edge, (b) said cooperating plate member (32) also being fixed to the ends of the spacing members (30), (3) a cooperating manifold portion (14) for providing a propellant manifold for a second propellant:

(a) said cooperating manifold portion being fixed to the outer edge of the body forming a manifold therewith, (b) a passageway (40) connecting said manifold with groove (38), (4) an annular flat means for cooperating with said main body portion for covering said annular propellant groove (38) around the outer edge of the body to form a closed manifold.

2. An injector head as set forth in claim 1 wherein all of said second and third orifices are tilted at an angle to a radial plane passing therethrough.

3. An injector head as set forth in claim 2 wherein the angle is approximately 30°.

4. An injector head as set forth in claim 1 wherein each pair of adjacent cooperating second and third orifices are located at an angle toward each other so that flows passing therefrom impinge a short distance from the face of the injector.

5. An injector head as set forth in claim 3 wherein the propellant exiting through a cooperating first orifice impinges on the streams issuing from said second and third orifices.

6. An injector head as set forth in claim 1 wherein the injector face is formed of a plurality of radial sectors each having a flat surface and tapering inwardly from an outer circular edge of said main annular member (18) to an opening (22) at the center of said member (18).

7. An injector head as set forth in claim 6 wherein said main annular member (18) is formed of a plurality of like internal radial segments and said passageways (50) extend inwardly for each segment parallel to each other, said inner ends of said passageways on adjacent halves of adjoining radial segments meeting at their inner ends.

8. An injector head as set forth in claim 1 wherein liquid oxygen is connected to said slots and gaseous hydrogen is connected to the passageways extending inwardly from said groove.

9. An injector head as set forth in claim 1 wherein the injector face is formed as a cone tapering inwardly from an outer circular edge of said main annular member (18a) to an opening (22) at the center of said member (18a), a plurality of annular grooves concentrically formed from adjacent the opening (22) to a point adjacent the outer circular edge, rings being positioned over said grooves, said second and third orifices being located in said rings.

10. An injector head as set forth in claim 1 wherein said rings are made of stainless steel.

References Cited

UNITED STATES PATENTS

| | | | |
|---|---|---|---|
| 2,982,097 | 5/1961 | Hull | 60—258 |
| 3,200,589 | 8/1965 | Mower | 60—39.74 |
| 3,221,499 | 12/1965 | Hasbrouck | 60—39.74 |

MARTIN P. SCHWADRON, *Primary Examiner.*

D. HART, *Assistant Examiner.*